Feb. 12, 1957 R. CLIBORN 2,781,105
SELF-LUBRICATING GEAR ASSEMBLY
Filed Feb. 2, 1953 2 Sheets-Sheet 1
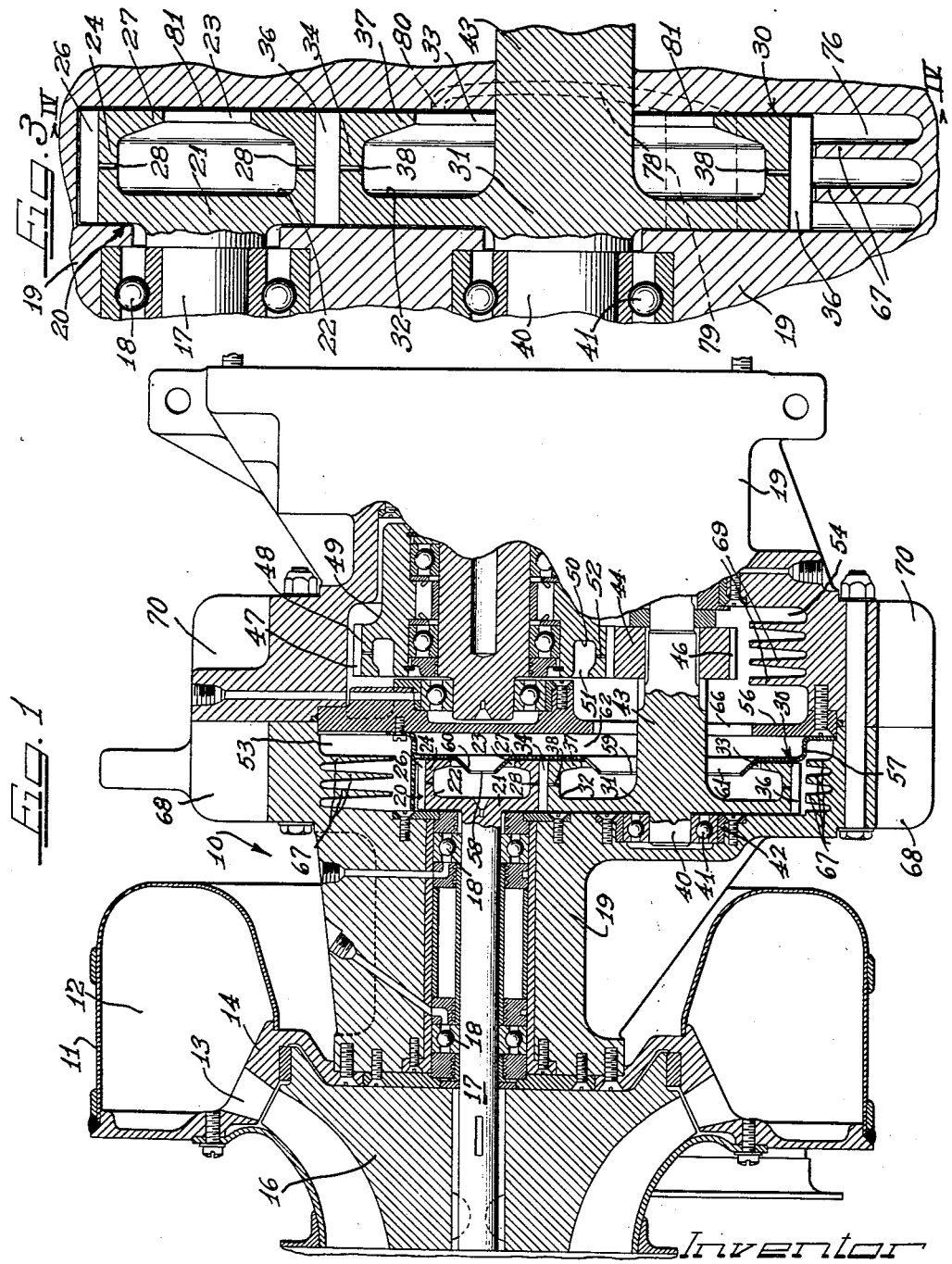
Inventor
ROBERT CLIBORN
Attys.

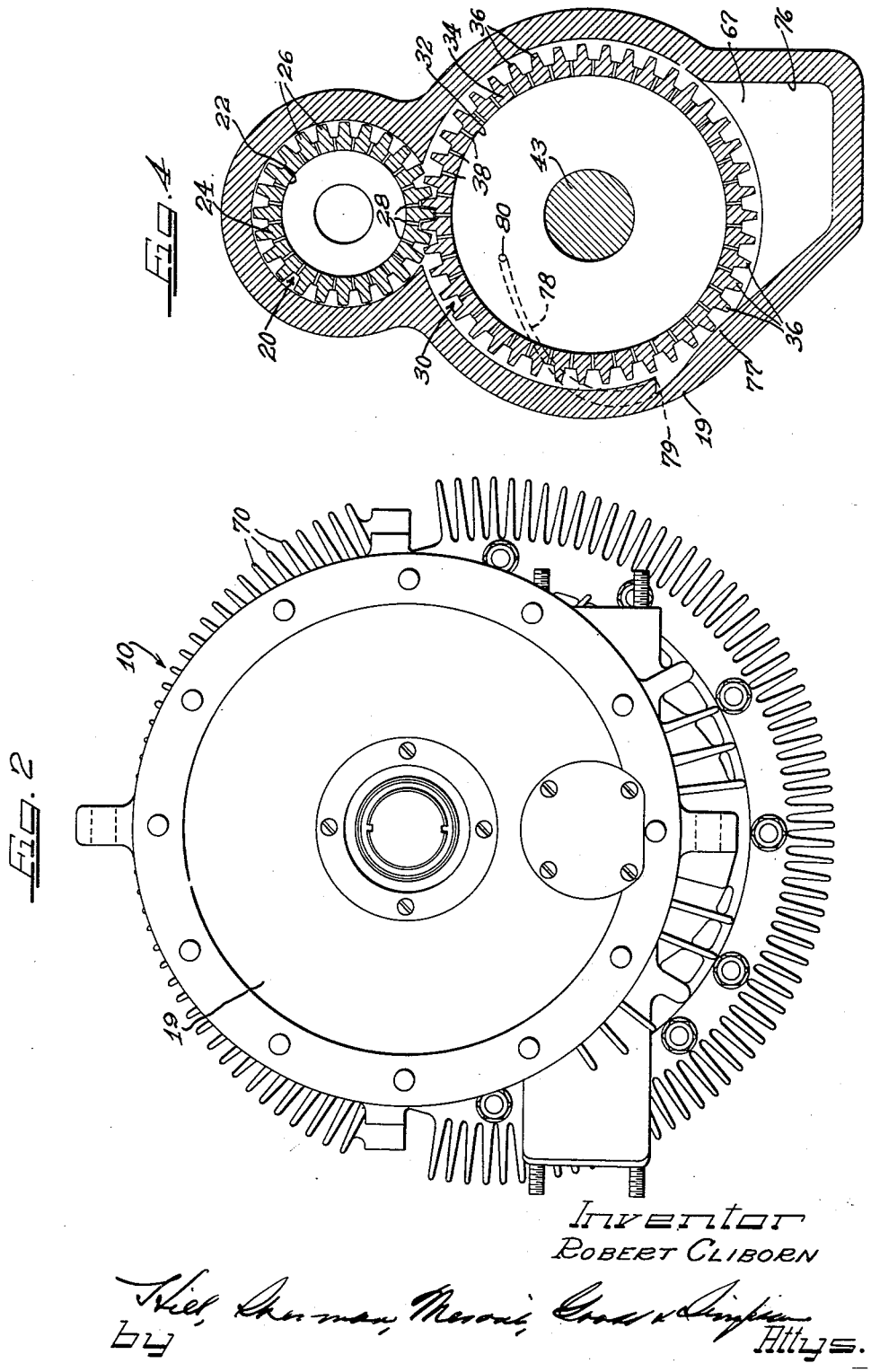

United States Patent Office 2,781,105
Patented Feb. 12, 1957

2,781,105
SELF-LUBRICATING GEAR ASSEMBLY

Robert Cliborn, Cleveland, Ohio, assignor to Thompson Products, Inc., Cleveland, Ohio, a corporation of Ohio Application February 2, 1953, Serial No. 334,631

5 Claims. (Cl. 184—11)

This invention relates generally to high speed turbine-driven gear mechanisms and more particularly to an assembly wherein a turbine is used to drive a pinion and gear each having hollow interiors forming lubricant reservoirs and annular overhung rim portions having circumferentially spaced gear teeth on the periphery thereof, a casing being provided with a sump surrounding the pinion and gear and holding a supply of lubricant in proximity to the gear with means provided in the casing for conducting a supply of lubricant to the interiors of the pinion and the gear whereupon rotation of the pinion and gear will keep lubricant around the periphery of the pinion and gear interiors and passageways formed in the rim portions will communicate lubricant flow from the hollow interiors to the meshing teeth.

The development of high speed turbine-driven gear mechanisms has presented a lubrication problem in pinion and gear assemblies which is solved in accordance with the principles of the present invention by continuously circulating a supply of lubricant through the gearing without requiring manual replenishing.

The exemplary structure herein disclosed is a drive mechanism for an aircraft accessory and the casing is prepacked for life during the course of assembly with a semisolid lubricant such as a high temperature grease which is commercially available. Such a grease does not change to a completely liquid form in a normal operating temperature range of the structure disclosed but does have a tendency to flow, or to release liquid oil, sufficient to lubricate running surfaces. Accordingly, as used herein, the term "lubricant" is intended to refer to such semisolid, high temperature greases and the terms "flow" and "circulation" are to be understood as referring to the circulatory movement of such portions of the lubricant that are in liquid form or as referring to the movement of portions of the lubricant resulting from having been thrown or impelled by moving components of the mechanism.

The continuous circulation of lubricant through the gearing also picks up heat which is generated through the operation of the gearing and the heat is dissipated so as to effectively minimize the operating temperature of the gear train.

To achieve these ends, the present invention contemplates the utilization of a pair of meshing gears, each including a gear hub having annular recesses formed therein providing a lubricant reservoir. An annular rim is provided on each hub concentric with the recesses and a plurality of circumferentially spaced gear teeth are located on the external peripheral surface of the annular rim. The annular recesses formed in the gear hub are proportioned to control the deflection of the gear teeth under load and the annular rim is proportioned to transmit the deflection from a load carrying tooth to the next tooth coming in to mesh, thereby maintaining proper index location of the tooth when it is actually supporting a load.

The casing is constructed to provide means to conduct replenishing lubricant to the reservoirs and in one embodiment of the invention the casing has an open ended passageway having one end aligned to receive lubricant picked up and thrown by the teeth of one of the gears, the other end of passageway being aligned to discharge the lubricant into the reservoir of such gear.

Since the gears are rotated at high speed by the turbine drive, the lubricant will be kept around the periphery of the annular recesses and the gears are provided with radially extending holes extending to the teeth through the rim portions, thereby establishing lubricant flow for communication between the reservoir and the gear mesh.

The radially extending passageways in the gears will also conduct lubricant from the gear mesh into the other of the reservoirs so that a return flow of the lubricant to the sump may be effected.

It is an object of the present invention, therefore, to provide an improved lubrication system for a gear and pinion assembly.

A further object of the present invention is to provide a lubrication arrangement for a pinion and gear mechanism which will not require manual replenishment.

Yet another object of the present invention is to provide a lubricating arrangement for a pinion and gear assembly which will promote the efficient dissipation of heat.

Yet another object of the present invention is to provide a pinion and gear structure wherein gear teeth deflection will be controlled and wherein proper index location will be maintained during the loading of the gear teeth.

Many other features, advantages and additional objects of the present invention will become manifest to those versed in the art upon making reference to the detailed description which follows and the accompanying sheets of drawings in which preferred structural embodiments of a turbine-driven pinion and gear assembly embodying the principles of the present invention is shown by way of illustrative example.

On the drawings:

Figure 1 is a cross-sectional view with parts shown in elevation of a turbine-driven drive assembly incorporating a pinion and gear apparatus according to the principles of the present invention;

Figure 2 is an end elevational view of the structure shown in Figure 1;

Figure 3 is a fragmentary cross-sectional view of a slightly modified pinion and gear assembly according to the principles of the present invention; and Figure 4 is a cross-sectional view with parts shown in elevation and with parts removed for the sake of clarity taken substantially on line IV—IV of Figure 3.

A turbine-driven gear mechanism is indicated generally by the reference numeral 10 and comprises a turbine casing 11 having an annular inlet 12 directing a turbine driving medium through an annular row of circumferentially spaced nozzles 13 formed in a nozzle ring 14 toward a rotatable turbine 16 connected to a shaft 17.

The shaft 17 is journaled in spaced bearings indicated at 18 supported in a casing 19.

On the end of shaft 17 is provided a pinion indicated generally at 20 and including a hub portion 21 having an enlarged hollow interior provided by an annular recess 22, one side of the annular recess being open by virtue of a smaller diameter recess 23 formed on one face of the pinion 20.

Radially outwardly of the recesses 22 and 23, the pinion 20 is provided with an overhung annular rim 24 carrying a plurality of circumferentially spaced gear teeth 26.

The periphery of the recess 23 is bounded by a radially inwardly extending flange portion 27 provided on the annular arm 24.

A plurality of circumferentially spaced passages 28 are provided through the rim 24 so as to establish communication between the roots of the gear teeth 26 and the annular recess 22.

The pinion 20 is in mesh with a gear indicated generally at 30 and comprising a hub portion 31 formed with an enlarged hollow interior provided by an annular recess 32. One side of the annular recess 32 is open by virtue of a smaller diameter recess 33 being provided in one face of the gear 30.

Surrounding the annular recess 32 is an overhung annular rim 34 having formed on the outer peripheral surface thereof a plurality of circumferentially spaced gear teeth 36. The periphery of the recess 33 is bounded by a radially inwardly extending flange 37 formed on the rim 34.

A plurality of circumferentially spaced passages 38 are formed in the rim 34 and extend from the roots of the gear teeth 36 to the annular recess 32.

The gear 30 is provided with a shaft extension 40 journaled in a bearing structure 41 retained in the casing 19 by a bearing liner 42.

Extending outwardly from the other side of the gear through the annular recess 32 is a shaft 43 having keyed thereto a pinion 44 provided on its periphery with a plurality of circumferentially spaced teeth 46 and meshing with a plurality of circumferentially spaced gear teeth 47 on the outer annular rim 48 of a gear member 49. The gear member 49 may comprise one component of an overrunning clutch assembly, the details of construction of which are not necessary to the understanding of the principles of the present invention. For the purposes of this disclosure, it is sufficient to note that the gear member 49 is provided with an annular recess 50 forming a hollow chamber which extends inwardly into the gear member 49 from an opening 51 provided in one face of the gear member. A plurality of circumferentially spaced passages 52 communicate with the hollow interior provided by the annular recess to the roots of the gear teeth 47.

The casing 19 has formed therein a sump 53 which holds a supply of lubricant in proximity to the pinion 20 and gear 30. Additionally, the casing 19 provides a sump 54 in surrounding relationship to the pinion 44 and the gear member 49 so as to hold a supply of lubricant in proximity thereto.

Although the lubricant employed is actually oil, it preferably takes the form of a semi-solid corresponding to a grease having a tendency to flow as a direct function of the temperature thereof. When the gears 20, 30, 44, 49 are turned, the lubricant, being a semi-solid, will channel, however, the grease or lubricant will shear adjacent to the adjoining gear faces. In other words, there is virtually no space between the face of the gears 20, 30, 44, 49 and the wall of grease or lubricant which is adjacent to it. As long as the gears 20, 30, 44, 49 run cool, the grease will stay back slightly away from the gears 20, 30, 44, 49, but as soon as a slight amount of heat is generated due to loading the gears 20, 30, 44, 49, the grease or lubricant becomes warm and sags up against the gears 20, 30, 44, 49, thereby supplying a liquid lubricant for the gears 20, 30, 44, 49. The tendency of the lubricant to flow is directly a function of temperature, therefore, when the grease or lubricant is in the area of either a bearing, for example, 18 and 41, or a meshing gear, 20 and 30, or 44 and 49, it will tend to become fluid or liquid and flow as the temperature increases. When this lubricant flows into the gears 20, 30 and 40, the gears 20, 30 and 49 begin to distribute the lubricant around in the gear housing, and a portion of it actually enters the hollow hubs 22, 32 and 50 of the gears 20, 30 and 49, and then through radial holes 37, 38 and 52 which are located in the rims 24, 34 and 48 of the gears 20, 30 and 49, the grease or lubricant is then applied to the actual contacting faces of the gear teeth 26, 36 and 47. The structure which effects such operation will now be described in greater detail.

The casing 19 carries an internal partition member 56 which separates the sump 53 from the sump 54 and connected to the partition member 56 is a shroud member or baffle 57 which projects away from the partition member 56 in spaced relation thereto and in closely spaced relation adjacent the pinion 20 and the gear 30. The shroud member or baffle 57 can conveniently comprise a stamping and develops the function of a guide means since it includes an aperture 58 registering with the recess 23 in the pinion 20 and an aperture 59 registering with the recess 33 in the gear 30.

The edge portions of the apertures 58 and 59 are flared as at 60 and 61, respectively, so as to project through the recesses 23 and 33, respectively, into the annular recesses 22 and 32, respectively. Thus, the recesses 22 and 32 will communicate with a space 62 provided between the shroud member 57 and the partition member 56 through the openings 58 and 59. The recesses 22 and 32 which act as reservoirs, are replenished by lubricant impelled or thrown by the pinion and gear and deflected by the partition member 56 to which is attached the baffle 57. The flanges 60 and 61 also deflect lubricant along the side faces of the pinion 20 and gear 30 into the recesses 22 and 32.

The partition member 56 is provided with an opening 66 so that lubricant from the sump 54 can flow into the space 62 and will be conducted through the openings 58 and 59 into the annular spaces 22 and 32 of the pinion 20 and the gear 30. It will be understood that the annular recesses 22 and 32 actually form lubricant reservoirs and upon rotation of the pinion 20 and the gear 30 the lubricant in the reservoirs provided by the annular recesses 22 and 32 will be kept by centrifugal force around the periphery of the pinion and gear interiors so that such lubricant will be conducted through the passages 28 and 38 to the teeth 26 and 36 at the area of mesh.

In like manner, the lubricant in the sump 54 will pass through the opening 51 into the annular recess 50 and lubricate the teeth 46 and 47 at the area of mesh by passing through the radially extending passageways 52 formed in the gear member 49.

It should be particularly noted that the recesses 22 and 32 are formed in the pinion 20 and the gear 30 in such proportion relative to the overall size of the pinion 20 and the gear 30 that the deflection of the teeth 26 and 36 will be controlled whenever a load is being transmitted thereby. Furthermore, the annular rims 24 and 34 are also proportioned so as to transmit the deflection of any single one of the teeth 24 or 34 carrying the load to the next tooth coming into the mesh, thereby giving such tooth the proper index location at the time that such tooth is actually supporting load.

It will be appreciated that the pinion and gear assembly being driven by the turbine 16 will be rotated at exceptionally high speeds and, accordingly, it is contemplated that substantial heat energy will be generated. According to the principles of the present invention, it is contemplated that the lubricant in passing through the gear members will pick up heat which in turn will be conducted to the adjacent wall structure of the casing 19, thereby reducing the operating temperature of the gears.

In order to more effectively develop this functional feature, the sump 53 is provided with a plurality of radial fins which are indicated at 67 and which present a greatly increased surface area to the lubricant within the sump 53 so as to maximize the transmission of heat energy thereto.

In order to further promote the dissipation of heat energy, the exterior surface of the casing 19 is also provided with a plurality of circumferentially spaced fins 68 which increase the surface area exposed to the atmosphere, thereby maximizing the effective dissipation of heat energy from the casing 19.

In like manner, the sump 54 is characterized by the provision of a plurality of radial fins 69 to promote the transmission of heat from the lubricant in the sump 54 to the casing 19 and the exterior surface of the casing 19 is provided with a plurality of circumferentially spaced fins 70 corresponding in number and location to the fins 68 so as to further promote the effective dissipation of heat energy from the casing 19.

It should be further noted that wherever possible the wall structure of the casing 19 is brought as close as possible to the gear surfaces of the pinion 20 and the gear 30 and in this respect the shroud member 57 affords a closely spaced confronting relationship with the side faces of the pinion 20 and the gear 30 so as to provide an additional path of heat flow from the pinion 20 and gear 30 to the casing 19.

Referring now more particularly to the modification shown in Figures 3 and 4, the construction of the pinion and gear assembly is identical with that already described and, accordingly, like reference numerals are employed wherever appropriate. In this embodiment, however, the casing 19 is provided with a sump 76 which closely surrounds the pinion 20 and the gear 30 and holds a supply of lubricant in proximity to the gear 30.

As shown in Figure 4, the casing 19 is provided with a guide portion or baffle 77 which guides lubricant from the sump 76 into the spaces between the gear teeth 36. The casing 19 is provided with a passageway 78 which is an open ended passageway and which has one end indicated at 79 aligned to receive the lubricant which is picked up and thrown or forced by the gear teeth 36.

The other end of the passageway 78 is indicated at 80 and opens into the recess 33 of the gear 30 so as to discharge into the reservoir afforded by the annular recess 32.

Upon rotation of the gear 30, centrifugal force will keep the supply of lubricant in the reservoir at the peripheral edge of the recess 32 whereupon the lubricant will pass through the radially extending openings 38 and into the spaces between the gear teeth 36 and the gear teeth 26 at the area of mesh, thereby lubricating and cooling the teeth at the area of mesh.

Lubricant in between the teeth at the mesh will be forced through the openings 28 in the rim 24 of the pinion 20 into the reservoir afforded by the annular recess 22 and a recirculation flow will be effected since the lubricant in the reservoir will again pass into the sump 76 through the recess 23.

The radial fins 67 are used to transfer heat and direct the flow of lubricant and the gear case is closely spaced to the side faces of the pinion 20 and the gear 30 as is indicated by that portion of the gear case identified by the reference numeral 81 so as to maximize the transfer of heat from the pinion 20 and the gear 30.

Although various minor structural modifications might be suggested by those versed in the art, it should be understood that I wish to embody within the scope of the patent warranted hereon all such modifications as reasonably and properly come within the scope of my contribution to the art.

I claim as my invention:

1. A lubrication system for meshing gears comprising, a rotatable gear having circumferentially spaced gear teeth, a casing having a sump formed therein holding a supply of lubricant in proximity to the teeth of the rotating gear, means providing a passageway in said casing receiving at one end thereof lubricant displaced by the teeth of said gear, said gear having a hollow portion providing a lubricant reservoir communicating with the other end of said passageway, and passageway means formed in said gear communicating with said reservoir and conducting lubricant outwardly of said reservoir to the said teeth of said gear.

2. A lubrication system for a gear and pinion assembly, comprising, a casing having a chamber adapted to receive a charge of lubricant, a pinion and a gear meshing in said chamber, baffle means in said chamber guiding lubricant into the teeth of said gear, means in said casing providing a channel and receiving lubricant from said gear teeth, said gear having a hollow interior communicating with said channel and receiving lubricant therefrom, said gear also including radially extending passage means conducting lubricant from the hollow interior to the mesh of the pinion and the gear, said pinion having a hollow interior and also having radially extending passage means communicating with said mesh and conducting lubricant from said mesh to the hollow interior of said pinion, said pinion having means communicating the interior thereof with said chamber.

3. A turbo-gear mechanism, comprising, a turbine having a power take-off shaft carrying a rotatable pinion, a gear in mesh with said pinion, said pinion and said gear each having a hollow interior forming a lubricant reservoir and an annular overhung rim portion having circumferentially spaced gear teeth on the periphery thereof, a casing having a sump surrounding said pinion and said gear and holding a supply of lubricant in proximity to said gear, a guide means in said sump directing lubricant in said sump to the teeth of said gear, a passageway formed in said casing having one end thereof aligned to receive lubricant picked up and thrown by the teeth of said gear, the other end of said passageway being aligned to discharge lubricant into the hollow interior of said gear, whereupon rotation of said gear will keep the lubricant around the periphery of the lubricant reservoir in said gear, and passageways in the rim portions of said pinion and said gear communicating lubricant from the lubricant reservoir and said gear to the mesh of the gear teeth between said pinion and said gear and communicating lubricant from the mesh to the interior of the pinion.

4. A lubrication system for a gear and pinion assembly, comprising, meshed gears each having a recessed side face providing a hollow interior, a casing having a sump surrounding the gears and holding a supply of lubricant adjacent the teeth of one of the gears, said casing providing a wall adjacent said gear side faces, an open ended passageway formed in said casing having one end thereof aligned to receive lubricant picked up and thrown by the teeth of said one gear and having the other end thereof formed in and intersecting said wall and being aligned to discharge the lubricant into the hollow interior of said one gear, means for rotating said gears, whereupon lubricant in said hollow interior will be kept around the periphery of the gear interior, said gears having holes in the peripheral portions thereof establishing lubricant flow communication between the hollow interiors and the spaces between the gear teeth.

5. A lubrication system for a pair of rotatable intermeshing peripherally toothed parts comprising a pinion and gear assembly, a casing having a chamber permanently prepacked with a semisolid lubricant, a pinion and a gear meshing in said chamber to provide said pair of parts, said gear and said pinion each having an overhung rim and a hollow interior forming a lubricant reservoir recess for the pinion and gear, respectively, radially extending passageways from each respective reservoir recess formed in a corresponding pinion and gear and conducting lubricant from a corresponding reservoir recess radially outwardly to the area of mesh of the pinion and gear and means forming a baffle in said chamber longitudinally adjacent the adjoining side faces of said pinion and gear parts, said baffle having an opening formed therein opposite each corresponding one of said pinion and gear parts and a flange on said baffle at the edges of each said opening offset axially toward the adjoining pinion and gear part to deflect lubricant from between the adjoining side face of each corresponding pinion and gear part and said baffle into the corresponding reservoir recess to replenish the reservoir recess.

References Cited in the file of this patent

UNITED STATES PATENTS

| | | |
|---|---|---|
| 1,186,434 | Pierce | June 6, 1916 |
| 1,759,943 | Herrmann | May 27, 1930 |
| 1,915,330 | Morrill | June 27, 1933 |
| 1,995,288 | Acker | Mar. 26, 1935 |
| 2,086,644 | Sorensen | July 13, 1944 |
| 2,577,188 | Hall | Dec. 4, 1951 |

FOREIGN PATENTS

| | | |
|---|---|---|
| 19,780 | Great Britain | of 1910 |